United States Patent
LaVally et al.

(10) Patent No.: US 11,490,564 B2
(45) Date of Patent: Nov. 8, 2022

(54) DRAPER TRANSPORT LIFT ASSIST SYSTEM

(71) Applicant: DEERE & COMPANY, Moline, IL (US)

(72) Inventors: Michael C. LaVally, East Moline, IL (US); Michael L. Vandeven, Princeton, IA (US)

(73) Assignee: DEERE & COMPANY, Moline, IL (US)

( * ) Notice: Subject to any disclaimer, the term of this patent is extended or adjusted under 35 U.S.C. 154(b) by 336 days.

(21) Appl. No.: 16/911,463

(22) Filed: Jun. 25, 2020

(65) Prior Publication Data

US 2021/0400872 A1   Dec. 30, 2021

(51) Int. Cl.
*A01D 34/24* (2006.01)
*A01D 41/14* (2006.01)
*A01D 41/06* (2006.01)
B62D 13/04 (2006.01)
A01B 73/06 (2006.01)
A01B 69/00 (2006.01)
B62D 7/18 (2006.01)
(Continued)

(52) U.S. Cl.
CPC .............. *A01D 34/24* (2013.01); *A01D 41/06* (2013.01); *A01D 41/14* (2013.01); A01B 69/005 (2013.01); A01B 69/007 (2013.01); A01B 73/06 (2013.01); B62D 7/18 (2013.01); B62D 13/00 (2013.01); B62D 13/04 (2013.01)

(58) Field of Classification Search
CPC ..... A01B 69/005; A01B 69/007; A01B 73/00; A01B 73/005; A01B 73/06; A01D 34/24; A01D 41/06; A01D 41/14; A01D 41/16; A01D 47/00; B62D 7/18; B62D 13/00; B62D 13/04
See application file for complete search history.

(56) References Cited

U.S. PATENT DOCUMENTS 3,721,461 A * 3/1973 Nelsen ................. A01B 73/005
172/240
4,923,014 A 5/1990 Mijnders
(Continued)

FOREIGN PATENT DOCUMENTS

EP   2138026 B1   12/2009

*Primary Examiner* — Arpad F Kovacs
*Assistant Examiner* — Arpad Fabian-Kovacs
(74) *Attorney, Agent, or Firm* — Taft Stettinius & Hollister LLP; Stephen F. Rost

(57) ABSTRACT

A header including a cutter bar configured to cut crop for harvesting and a header frame supporting the cutter bar. A transport assembly is operatively connected to the header frame. A support arm is rotatably coupled to an axle of the transport assembly and is pivotably coupled to a mounting frame coupled to the header frame. A cam linkage is disposed at the support arm to provide a mechanical advantage for an operator when moving the transport assembly from a transport position to a harvest position. The cam linkage includes a lift assist device having a first end connected to the mounting frame and a second end coupled to a cam arm. Extension of the second end from the first end of the lift assist device applies the cam arm to a cam surface of the support arm to move the transport assembly to the harvest position.

20 Claims, 10 Drawing Sheets

(51) Int. Cl.
 *A01B 69/06* (2006.01)
 *B62D 13/00* (2006.01)

(56) References Cited

U.S. PATENT DOCUMENTS

| | | | | |
|---|---|---|---|---|
| 5,000,268 | A | * | 3/1991 | Zimmerman ........ A01C 15/005 172/240 |
| 5,243,810 | A | | 9/1993 | Fox et al. |
| 6,209,297 | B1 | * | 4/2001 | Yeomans ............ A01B 73/005 56/228 |
| 7,552,579 | B2 | | 6/2009 | Tippery |
| 7,926,249 | B1 | * | 4/2011 | Cook ................... A01B 73/005 172/240 |
| 8,025,312 | B1 | * | 9/2011 | Honas ................. A01D 75/002 56/228 |
| 9,179,592 | B2 | * | 11/2015 | Snider .................. A01B 69/003 |
| 9,596,808 | B2 | * | 3/2017 | Fay, II ................ A01B 73/005 |
| 10,405,481 | B2 | | 9/2019 | Chen et al. |
| 11,124,232 | B2 | | 9/2021 | Chen et al. |
| 11,178,806 | B2 | * | 11/2021 | Chen ................... A01B 73/005 |
| 2014/0003898 | A1 | | 1/2014 | Meenen et al. |
| 2015/0313084 | A1 | | 11/2015 | Cook et al. |
| 2018/0310462 | A1 | | 11/2018 | Chen et al. |
| 2020/0053949 | A1 | | 2/2020 | Chen et al. |
| 2020/0055545 | A1 | | 2/2020 | Chen et al. |
| 2021/0307247 | A1 | * | 10/2021 | Lyons ................. A01D 75/004 |

* cited by examiner

DRAPER TRANSPORT LIFT ASSIST SYSTEM

FIELD OF THE DISCLOSURE

The present disclosure relates to a header assembly for a work machine, and more particularly to a transport assembly of the header.

BACKGROUND

Agricultural harvesters, such as agricultural combines, are designed to travel through agricultural fields harvesting crops. Agricultural combines receive crop severed from the ground and convey it to threshing, separating, and cleaning devices within the agricultural combine. In a typical arrangement, an agricultural harvesting header, also known as draper, severs the crop from the ground and conveys it to a central region of the harvesting header where it is then conveyed rearward into a central and forwardly opening aperture in the front of the agricultural combine.

Agricultural harvesting headers are quite long, on the order of 10-15 meters in overall length. In order to accurately follow the contours of the ground and sever crop at the appropriate point on the stem, agricultural harvesting heads have been made in sections that are generally hinged with respect to each other. A typical agricultural harvesting header of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

To better follow the contours of the ground, the agricultural harvesting header is mounted to the front of a feederhouse of the combine, such that the header can move with respect to the feeder house. In one arrangement the agricultural harvesting header is a draper header having three frame sections (a center section, a left-wing section and a right wing section). The frame sections can pivot up and down with respect to one another and thereby follow the contours of the ground.

The header, due to its length and overall size, is fitted with one or more transport assemblies that include wheels so that the header can be moved along rows of crops for harvest as well as being transported over the ground when the header is moved to another location. In different types of headers, the transport assemblies are permanently coupled to the header, but are movable between a transport position and a harvest position. In the transport position, an axle supported by a pair of wheels is generally perpendicular to a longitudinal length of the header. When the header is being prepared for harvest, the axle is rotated from the transport position to the harvest position by rotating the axle, such that the axle is generally aligned with the longitudinal length of the header. In this position, the wheels contact the ground and support the header as it moves through a field for the harvest.

The transport assembly is not only heavy, but is relatively cumbersome, to move from the transport position to the harvesting position and back. Consequently, what is needed is a transport assembly that is more easily moved from the transport position to the harvesting position and back to the transport position.

SUMMARY

In one embodiment, there is provided a transport assembly for a harvest header having a header frame. The transport assembly includes a lift assist frame fixedly coupled to the header frame and a support arm rotatably coupled to an axle of the transport assembly and pivotably coupled to the lift assist frame. A cam linkage is disposed at the lift assist frame and the support arm, wherein the cam linkage provides a mechanical advantage for an operator to move the transport assembly from a transport position to a harvest position.

In another embodiment, there is provided a header for harvesting crop including a cutter bar configured to cut crop for harvesting and a header frame supporting the cutter bar. A transport assembly includes a mounting frame operatively connected to the header frame. A support arm is rotatably coupled to an axle of the transport assembly and pivotably coupled to the mounting frame. A cam linkage is disposed at the mounting frame and the support arm, wherein the cam linkage provides a mechanical advantage for an operator to move the transport assembly from a transport position to a harvest position.

In a further embodiment, there is provided a method of moving a transport assembly of a harvesting header from a transport position to a harvest position wherein the transport assembly includes an axle supporting wheels and a support arm operatively connected between the axle and a frame of the harvesting header. The method includes enabling rotational movement of the axle about the support arm, assisting pivotal movement of the support arm in response to a upward force applied to the axle, applying a force with a cam roller to a cam surface of the support arm in response to the assisted pivotal movement to move the transport assembly to the harvest position, and engaging a latch of the transport assembly with a frame of the harvesting header in response to the applied cam roller to the cam surface and the upward force applied to the axle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
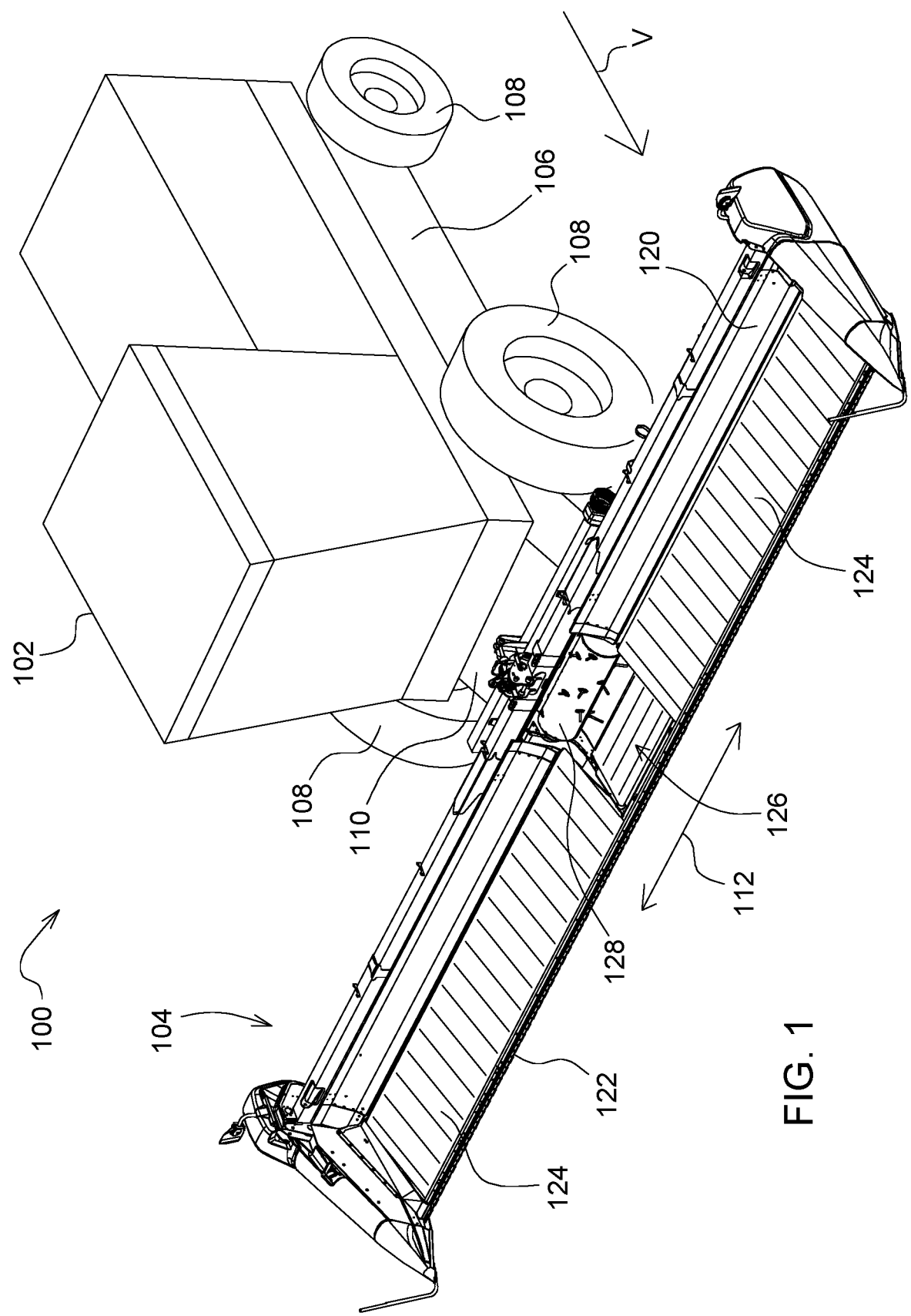
FIG. 1 is a perspective view of an agricultural harvesting header coupled to an agricultural combine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

FIG. 1 illustrates an agricultural harvester 100 that has an agricultural combine 102 and an agricultural harvesting header 104. The agricultural combine 102 includes a chassis 106, which is supported on four ground supports 108, and a feederhouse 110, extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and/or cleaned.

The agricultural combine 102 is a self-propelled vehicle which is driven over the ground by a power source such as an electric motor or motors or an internal combustion engine. The ground supports 108 are preferably wheels or tracks. At least one of them are driven in rotation by motors to propel the agricultural combine 102 over the ground.\

The feederhouse 110 is pivotally connected to the front of the combine 102 and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular frame that is configured to support the agricultural harvesting header 104. The feederhouse 110 is positionable with respect to the combine 102 and can be raised and lowered to raise and lower the header 104 with respect to the ground, as is understood by one skilled in the art.

The header 104 includes a length that extends longitudinally along a longitudinal direction 112, that is generally perpendicular to a direction of travel of the combine 102. The header includes one or more transport assemblies, as further described in FIGS. 2-4, that support the header 104 as it travels over the ground.

The agricultural harvesting header 104 includes an extending main frame 120 that extends perpendicular to a fore-and-aft harvesting direction of travel "V" of the agricultural harvester 100 and perpendicular to the longitudinal axis of the agricultural combine 102. The agricultural harvesting header 104 further includes a reciprocating knife or cutter bar 122 that extends across almost the entire length of the agricultural harvesting head 104. This reciprocating knife is disposed immediately in front of cut crop conveyors 124 that carry cut crop to a central conveyor 126 that conveys the cut crop rearward and underneath a drum conveyor 128 through a chute of the header. The chute is connected to feederhouse 110 which received the cut crop.

Figure 2:
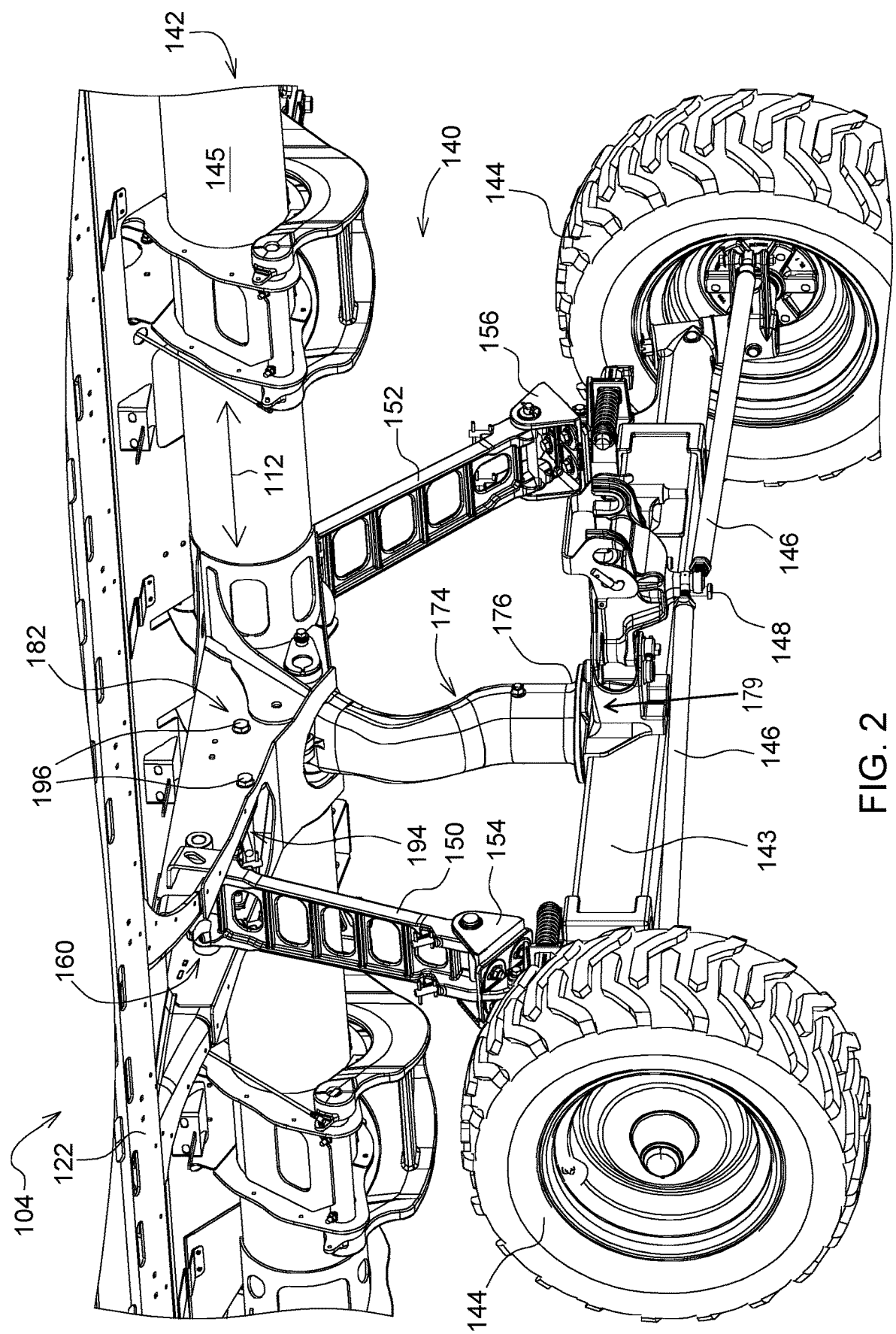
FIG. 2 is a underneath perspective view of a portion of a header.

FIG. 2 illustrates a underneath perspective view of a portion of the header 104, and more particularly of a transport assembly 140 for the header 104. The header 104 includes a frame 142, which extends along the direction 112. The frame 142 supports the cutter bar 122, as well as the other features of the header 104, including but not limited to the side conveyors 124, the central conveyor 126, and the drum conveyor 128. In the illustrated embodiment, the support is a frame tube 145. Other frame supports are contemplated. While one transport assembly 140 is illustrated, a second transport assembly (now shown) is located toward another end of the header 104, such that a major portion of the header 104 is supported between two spaced apart transport assemblies.

As seen in FIG. 2, the transport assembly 140, which is shown in the transport position, includes an axle 143 that extends between and supports a pair of tires 144, each of which rotates about the axle 143. While a square tube axle is shown, other types of axles are contemplated. A pair of tie rods 146 extends from a centrally located connector 148 toward respective tires 144.

Figure 3:
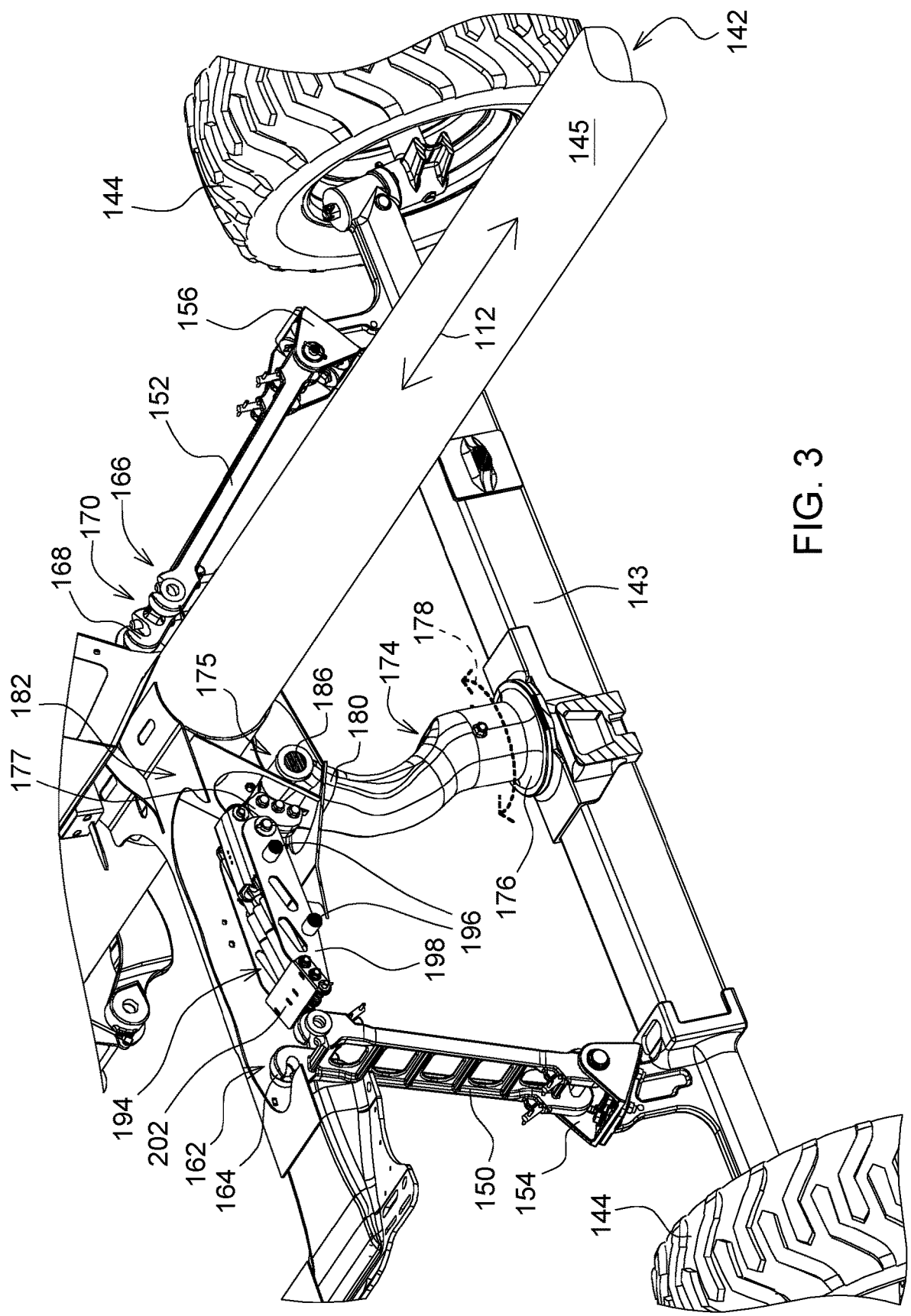
FIG. 3 is a partial bottom perspective view of a transport assembly of a header.
Figure 4:
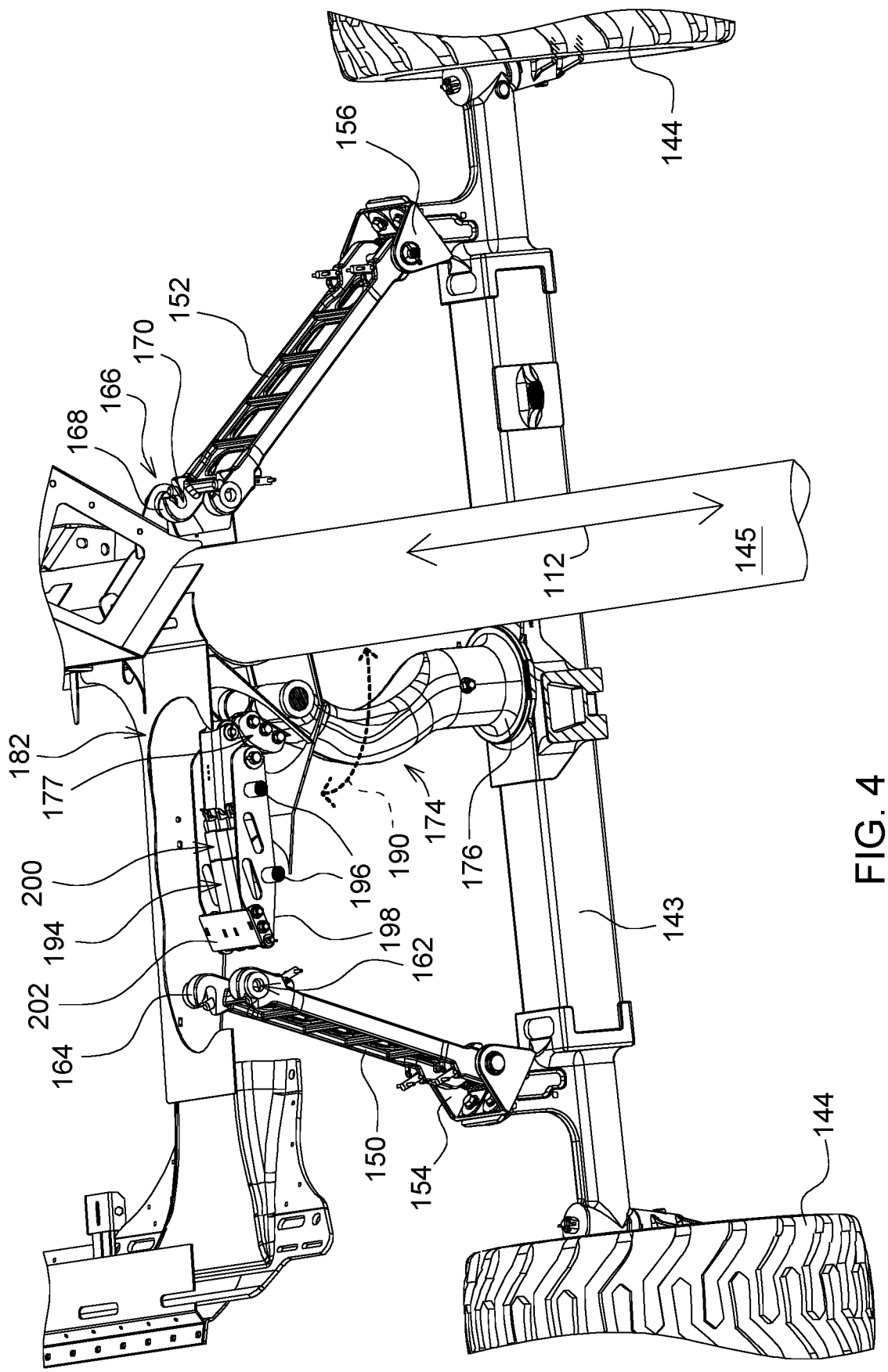
FIG. 4 is a partial perspective end view of the view of a lift assembly of a transport assembly.

The transport assembly 140 of FIG. 2 illustrates two tie rods 146 which are used for steering when the FIG. 2 assembly is located at a forward end of the header 104. In one or more embodiments, when the transport assembly is located at a rear end of the header 104, (the end opposite the end being pulled by a vehicle for transport) the tie rods 146 are not included as steering is not necessary for a transport assembly when located toward at the rear. In FIGS. 3 and 4, the tie rods 146 are not illustrated for ease of illustration.

When the transport assembly 140 is located in the transport position, in one embodiment, the axle 143 is operatively connected to the frame 142 through a first support bar 150 and a second support bar 152, also known as ladder bars or down struts, each of which have first ends rotatably coupled to the axle 144 at respective support brackets 154 and 156. When the transport assembly 140 is in the transport position, a second end 160 of support bar 150 is releasably connected to the frame 142 at a pin (not shown) the location 162 of which can be seen in FIG. 3. The second end 160 includes one or more hooked ends 164 which engage the pin 162 to maintain the position of the axle 143 to be substantially perpendicular to the frame 142. The support bar 152 is substantially configured as the support bar 150 and includes a second end 166 including a hooked end 168 that engages a pin (not shown) at a location 170 fixedly coupled to the frame 142.

The transport assembly 140 further includes a support arm 174 having a first end 176 that is rotatably coupled to a center portion of the axle 143 with a rotary connector 179 such as a rotary hinge. As seen in FIG. 3, the axle 143 rotates about the support arm 174 along a rotational direction 178. A second end 180 of the support arm 174 is pivotably coupled to the frame 142 through a frame bracket 182 with pivoting connector such as a pivoting hinge. See also FIG. 4. The frame bracket 182 is fixed to the frame 142 and the support arm 174 includes a second end 175 that pivots about a pivot axis defined by a pin 186 extending through the frame bracket 182. The pivoting of the second end 175 of the arm 174 at the pin 186 is generally perpendicular to the longitudinal axis 112 of the frame 142 as shown by pivot direction 190 in FIG. 4. A cam plate 177 is fixedly connected to the second end 175.

Figure 8:
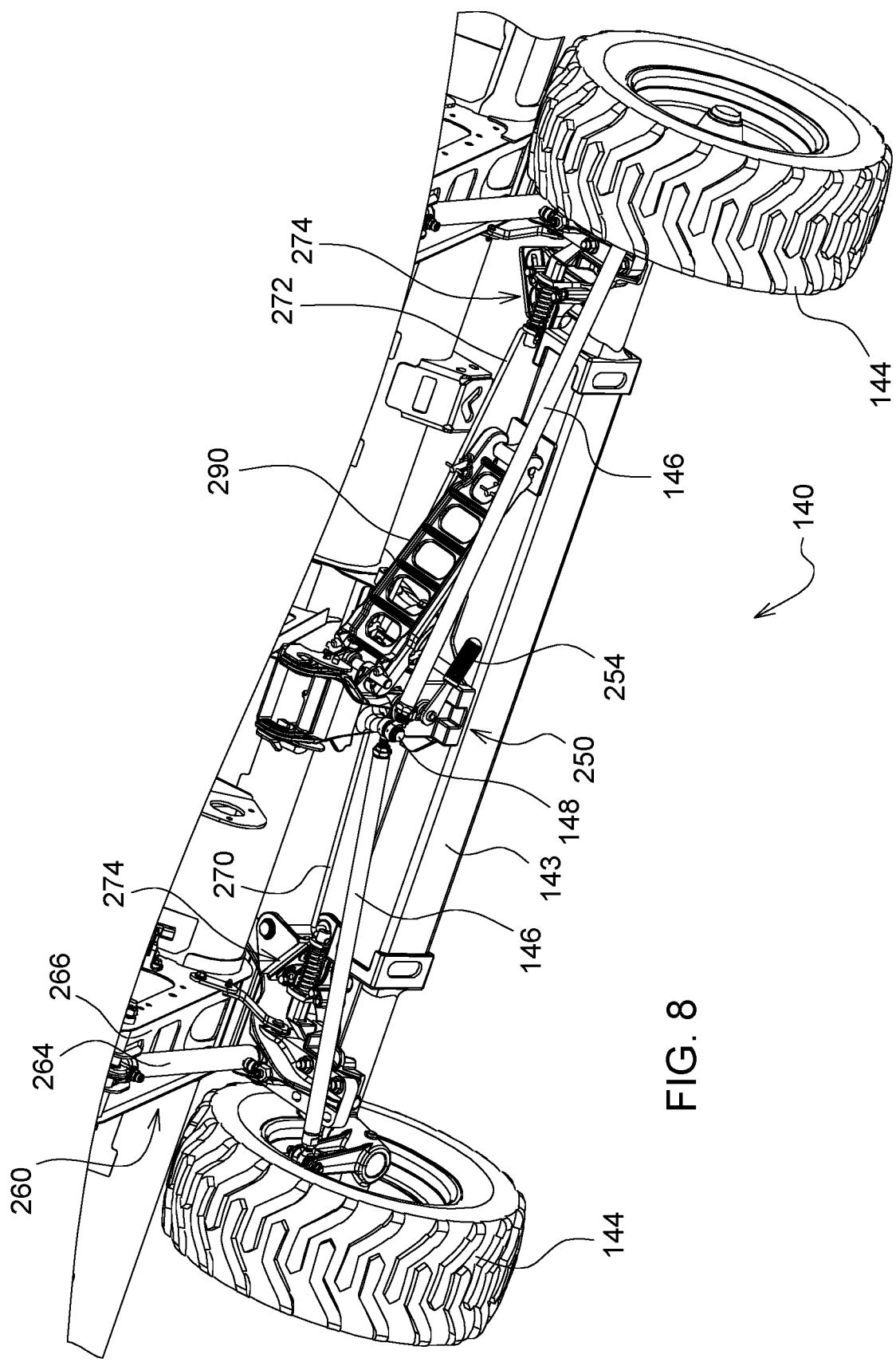
FIG. 8 is a perspective view of a transport assembly including a latching mechanism in a latched condition.

The transport assembly 140 includes a lift assist assembly 194 which is fixedly connected to the mounting frame 182. The lift assist assembly 194 provides a mechanical assist to an operator to move the transport assembly 140 from the transport position to the harvest position. To move the transport assembly from the transport position of FIG. 4 to the harvest position as shown in FIG. 8, the header 104 is raised to so that the tires 144 are no longer in contact with the ground. In this position, the axle 143 is suspended from the frame 142 by the arm 174, the support bar 150, and the support bar 152. By lifting one tire and then the next, the support bar 150 is detached from the pin 162 and the support bar 152 is detached from the pin 170. Each of the bars 150 and 152 are then rotated in a downward direction toward the axle 143 about respective pivot locations at respective support brackets 154 and 156. Once the support bars 150 and 152 are detached, the axle 143 is rotatable about the arm 174 at the end 176 in the direction 178.

To raise the transport assembly 140, the axle 143 is rotated about the arm 174 until the axle 143 is generally parallel with the frame tube 145. At this position, the axle 143 is raised and pivots about the pin 186. Because the transport assembly 140 is relatively heavy, the lift assist assembly 194 provides a mechanical advantage to the operator raising the transport assembly 140 to the harvest position. In one or more embodiments, the transport assembly 140 includes a weight of from 425 to 510 pounds. To enable the transport assembly 140 to be moved to the harvest position, the lift assist assembly 194 provides additional lifting force sufficient to enable a single operator to raise the transport assembly. Other weights of transport assemblies and other lift assist assemblies sufficient to raise those transport assemblies are contemplated. The mechanical advantage increases as the operator lifts the assembly and decreases when lifting is no longer needed due to changing moment arms.

The lift assist assembly 194 is fixedly connected to the mounting frame 182 by mounting bolts 196 that extend through a lift assist frame 198. One or more lifts assist devices 200, supported by the lift assist frame 198, are used to provide lift assistance to the operator. While three lift assist devices 200 are illustrated, other numbers of lift assist devices are contemplated. Additionally, other lift assist devices include, but are not limited to, gas struts, springs, cylinders, shocks, and spring struts.

Figure 5:
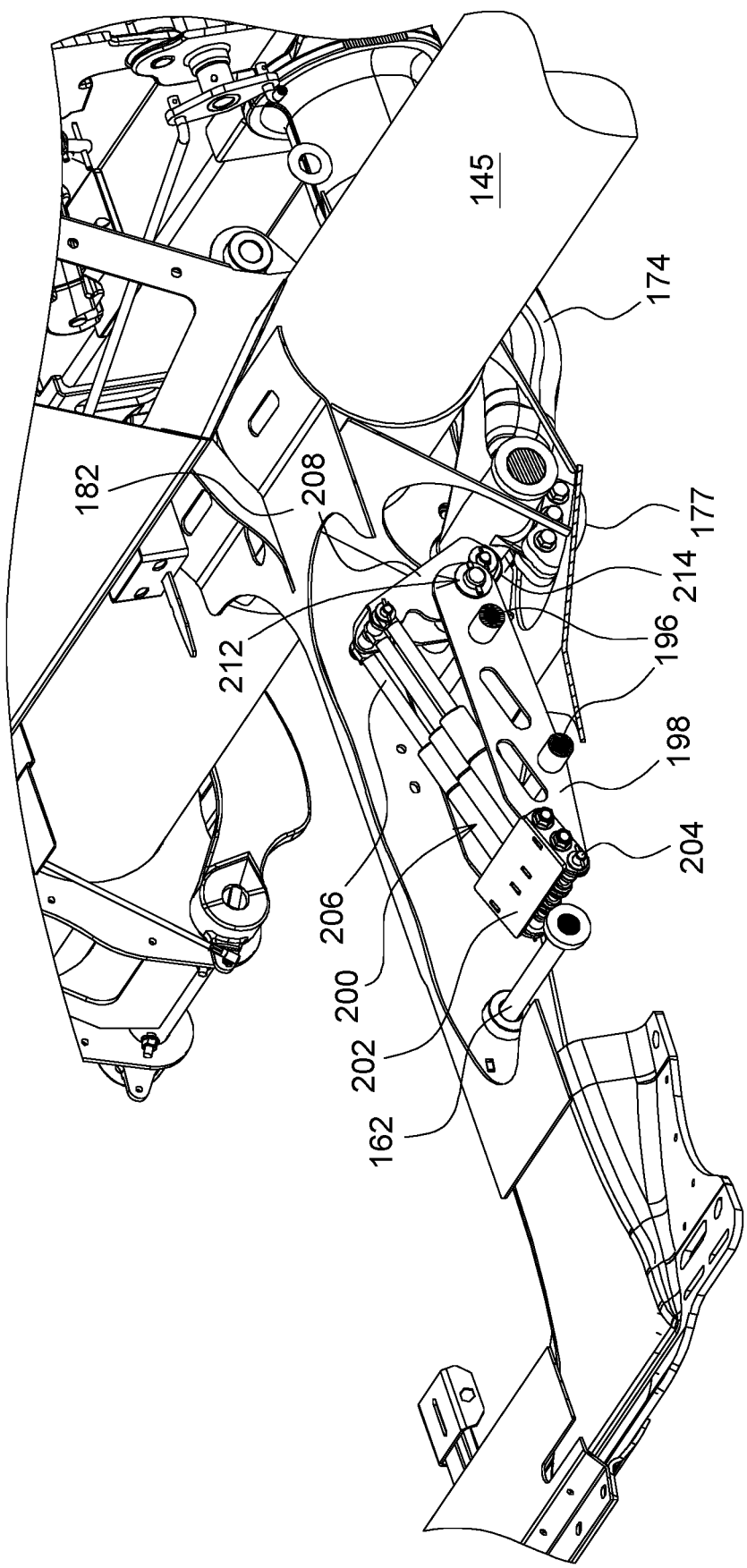
FIG. 5 is a perspective view of the lift assembly shown in FIG. 4.

As seen in FIG. 5, a mounting plate 202 is fixedly connected to the lift assist frame 198. Each of the one or more gas struts 200 includes a cylinder end rotatably coupled to a pivot rod 204. Each of the one or more gas struts includes an arm 206 that is coupled to a first end of a cam arm 208 that is rotatably coupled to the frame 198 at a pivot location 212 defined by a rod. A roller 214 is rotatably connected to a second end of the cam arm 208 and contacts a cam surface of the cam plate 177 that directs movement of the arm 174. The roller 214, the cam arm 208, and the cam plate 177 define a cam linkage to move the transport assembly from the transport position to the harvest position and from the harvest position to the transport position.

Figures 6A, 6B, 6C:
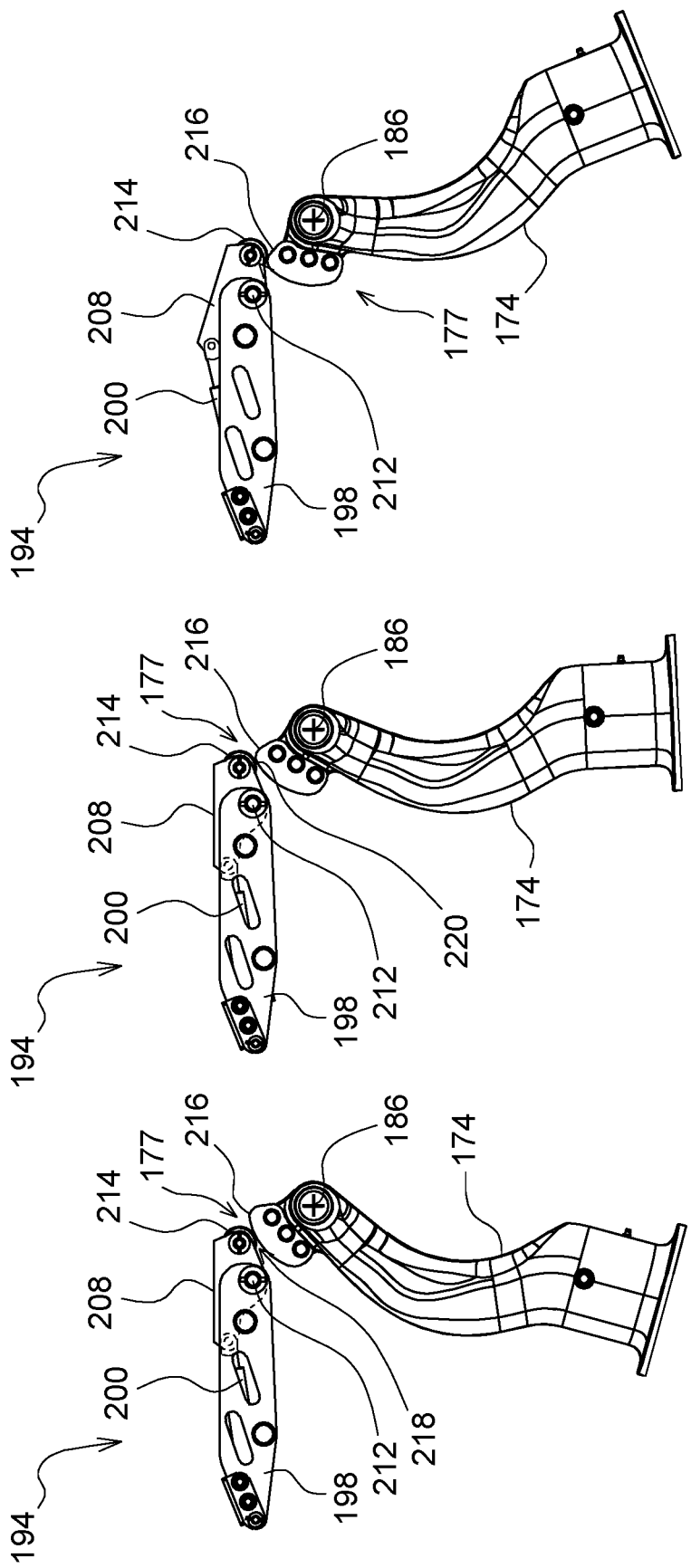
FIGS. 6A to 6E illustrate a sequence of movement of a lift assist assembly from a transport position to a harvest position.

FIGS. 6A to 6E illustrate a sequence of movement of the lift assist assembly 194 from an initial position when the transport assembly 140 is in the transport position, see FIG. 6A, to a final position when the transport assembly 140 is in the harvest position 6E. Initially in FIG. 6A, that arms of the gas struts 200 are not extended and the cam arm 208 is relatively aligned in parallel with the lift assist frame 198. The support arm 174 extends in a downward direction to the axle 143, not shown. The roller 214 is in contact with a cam surface 216 of the cam arm 208. In FIG. 6A, a movement in the opposite direction of actuation of the lift assist assembly is shown, which could occur if the header is lowered with everything unlatched. By using this configuration, part damage is substantially prevented, as the parts could crack or fail otherwise, if the lift assembly was prevented from rotating in that direction.

The cam surface 216 includes a forward facing surface 218 upon which the roller 214 is located. As the operator begins to raise (i.e, apply an upward force to the axle) the transport assembly 140, the arms of the gas strut or struts 200 begins to extend and the cam roller 214 applies a force to the cam surface 216 which pivots the support arm 174. Upon continued extension of the gas struts 200, the cam roller 214 moves toward an apex 220 of the cam plate 177 as seen in FIG. 6B. The apex 220 acts as detent to hold the axle in the transport position. As the transport assembly 140 is lifted further, as seen in FIG. 6C, the arms of the gas struts 200 extend and the cam arm 208 pivots about the pivot 212 which forces the cam plate 177 and therefore the cam arm 174 about the pivot axis defined by a pin 186. The cam roller 214 continues to move along the cam surface toward a back portion of the cam plate 177.

Figure 6E:
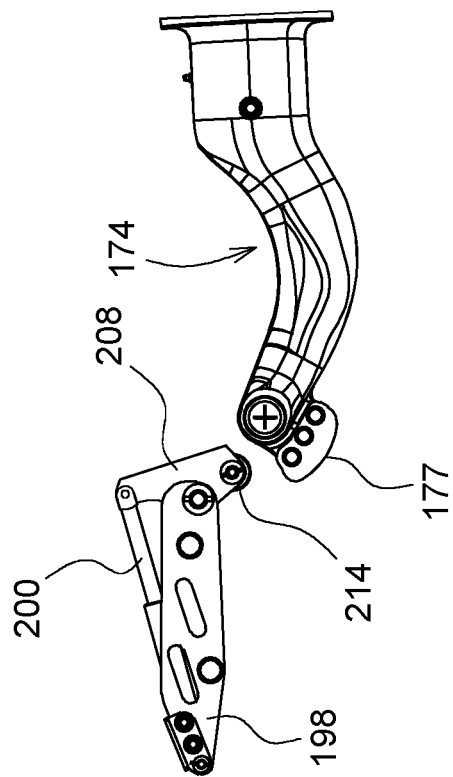
Figure 6D:
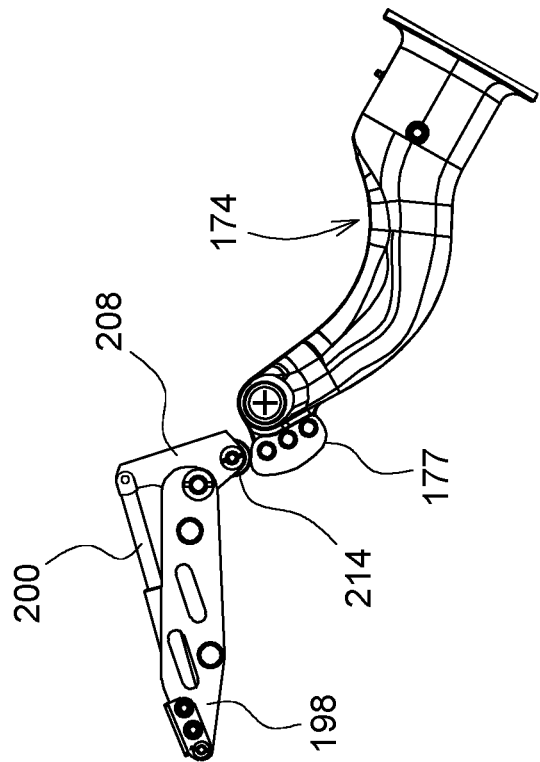

The force provided by the extended arms of the gas struts 200 presses down on the cam plate 177 and continues to move the support arm 174 toward a more horizontal position as seen in FIG. 6D. Once the transport assembly 140 is moved to the harvest position, the transport assembly 140 is latched in place. At this location of the transport assembly, the cam roller 214 is completely separated from the cam surface 216 of the cam plate 177 as seen in FIG. 6E. In one or more embodiments, the cam surface 216 of the cam plate 177 includes detents that are configured to receive the cam roller 214.

Once the cam roller 214 and the cam plate 177 are separated in the harvest position, the lift assist is not actuated for most of the wheel assembly positions that occur during harvesting. As the wheels adjust to the contour of the ground during a harvesting operation, the lift assist is not engaged. This lack of engagement results in less material fatigue, less wear, and less gas spring degradation on the lift assist system.

Figure 7:
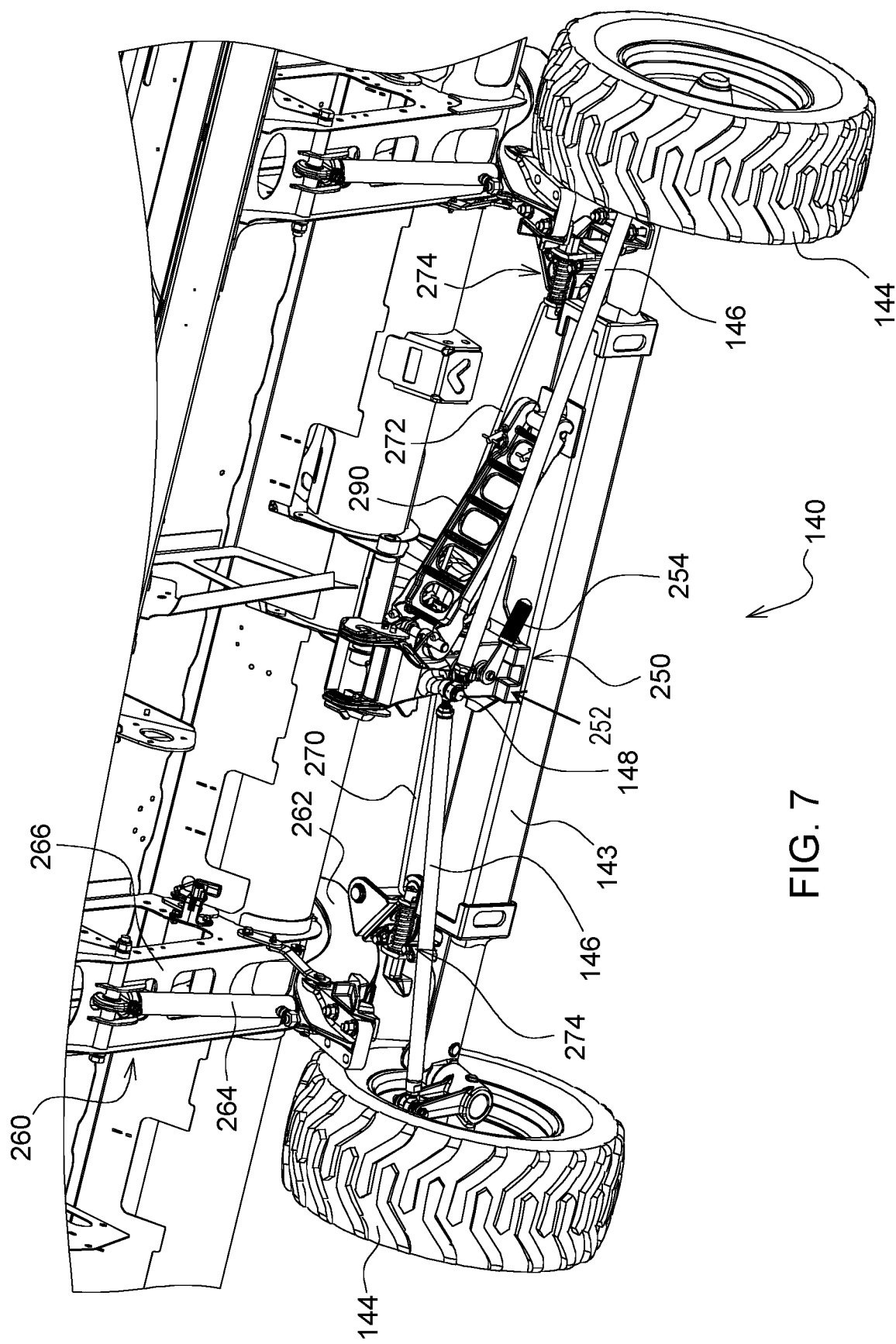
FIG. 7 is a perspective view of a transport assembly including a latching mechanism in an unlatched condition.

The transport assembly 140 as seen in FIG. 7 includes a latching mechanism 250 having a latch frame 252 that is fixedly connected to the axle 143. A latch handle 254 is rotatably coupled to the latch frame 252 and rotational movement of the latch handle 254 releases the transport assembly 140 to move the assembly 140 from the harvesting position to the transport portion. As seen in FIG. 7, the transport assembly 140 is not latched into the harvest position as indicated by a space between a suspension system 260 and the axle 143. The suspension system 260 includes a suspension frame 262 supporting a hydraulic actuator 264 that extends from the frame 262 to a hydraulic support 266 extending from the frame 142. As the transport assembly 140 moves to a final transport position, the frame 262 contacts the tube of the axle 143 and the latching mechanism 250 automatically latches to the suspension frame 262. The hydraulic actuators 264 position the transport assembly 140 with respect to the head and provide dampening of spike loads experienced by the transport assembly with respect to the header frame. In one or more embodiments, the hydraulic actuators 264 are part of a hydraulic system and are connected to a relief circuit that provides the dampening.

Figure 9:
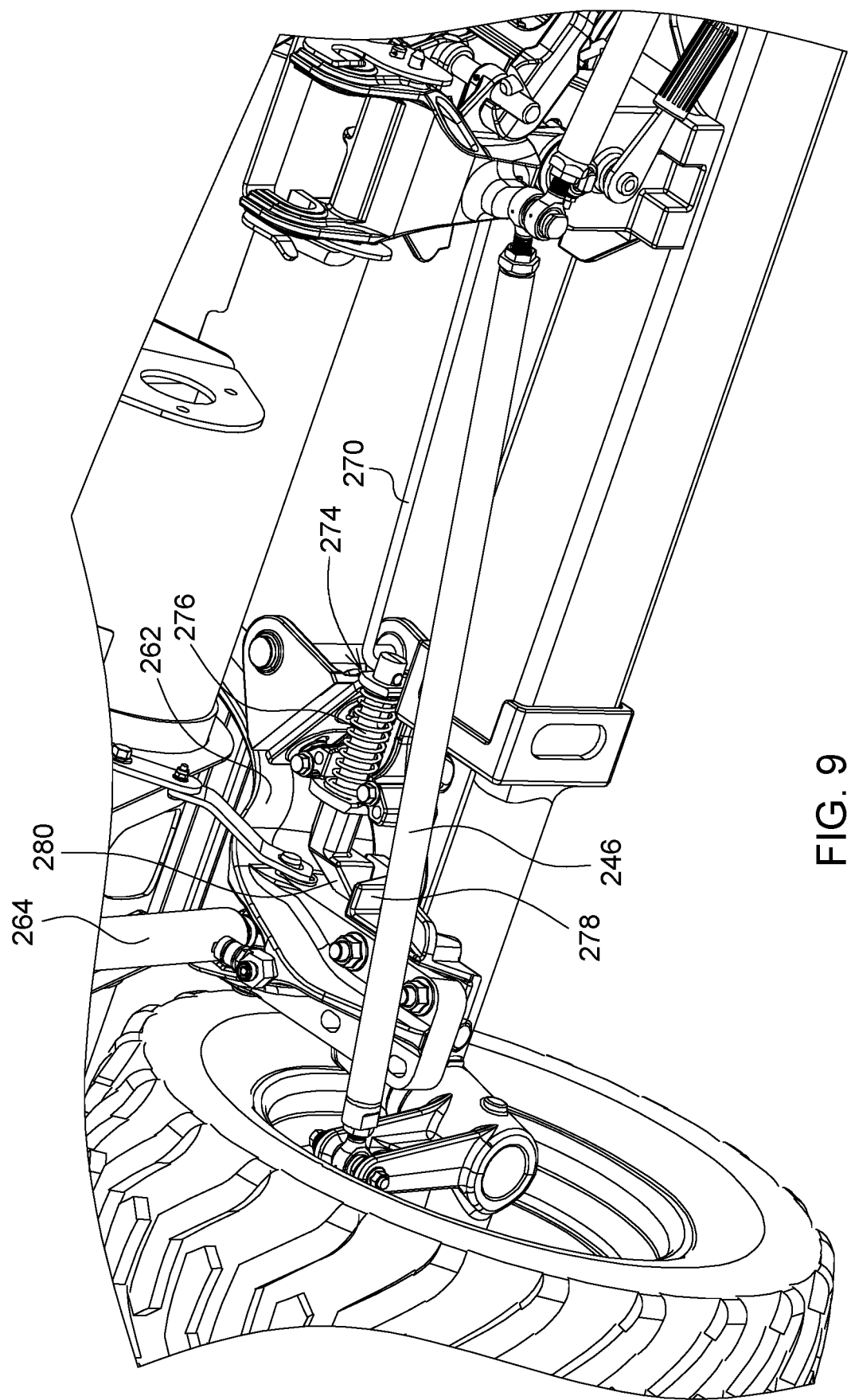
FIG. 9 is a perspective view of a portion of a latching mechanism in a latched condition.

As seen in FIGS. 8 and 9, the latch handle 254 includes a shaft that extends through the latch frame 252 to a first latch bar 270 and to a second latch bar 272. Each latch bar 270 and 272 is attached to respective spring loaded pin mechanisms 274. Since each spring loaded pin mechanism 274 is substantially similar, the spring loaded mechanisms of FIG. 9 is described in additional detail and applies equally the other spring load mechanism not shown.

In FIG. 9, the spring loaded mechanism 274 includes a spring loaded pin 276 that is spring biased toward the frame 262. The frame 262 include a catch 278 that engages a curved end of the pin 276 when the transport assembly 140 moves into position. As the transport assembly 140 moves towards the catch 278, a bottom surface of the catch 278 engages a curved surface 280 of the pin 276 until the pin 276 is located on a top surface of the catch 278. In this position, the pins 276 of each spring loaded mechanism 274 maintain the transport assembly 140 in a latched condition with the frame. To unlatch the transport assembly 140 from the frame 262, the latch handle 254 is rotated to disengage the pins 276 from the frames 262. Once disengaged, the transport assembly 140 can be moved to the transport position.

Once the transport assembly 140 is unlatched, an operator moves the transport assembly 140 from the harvest position to the transport position by slowly lowering the transport assembly 140 once the header has been sufficiently raised to provide clearance. As the transport assembly 140 is lowered, the lift assist dampens movement of the transport assembly to slowly lower the assembly, instead of it being lowered abruptly. The cam roller 214 engages the cam surface 216 in substantially the reverse order of FIG. 6, for instance from FIG. 6E to FIG. 6A to return the transport assembly 140 to the transport position.

The embodiment of FIGS. 7, 8, and 9 include a single support bar 290 as opposed to the embodiment of FIGS. 2-4, which include two support bars 152. In each embodiment, however, the support bar 152 and the support bar 290 fix the location of the axle 143 in a generally horizontal plane with respect to the frame 142.

The present disclosure includes the use of gas springs and a rocking lever arm that is rotated via a roller on a cam surface. By using a mechanical advantage, and the use of a detent, in one or more embodiments, holds the axle in the transport position. The lift assist is only actuated when a user begins to lift the transport assembly. In the described embodiments, no additional pins are needed as the cam automatically holds the axle in key positions. This provides many advantages as previous systems required lowering the header and using the ground to rotate the components of a transport assembly, which is not reliable. Consequently, the described embodiments substantially eliminates the need to use the ground and also eliminates a trip in and out of the cab.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transport assembly for a harvest header having a header frame, the transport assembly comprising:
   a lift assist frame fixedly coupled to the header frame;
   a support arm rotatably coupled to an axle of the transport assembly and pivotably coupled to the lift assist frame, the support arm including a transport position and a harvest position; and
   a cam linkage disposed at the lift assist frame and the support arm, wherein the cam linkage includes a roller operatively connected to the lift assist frame and a cam plate having an apex engaged by the roller, the cam plate connected to the support arm, and further wherein the cam linkage provides a mechanical advantage for an operator to move the transport assembly from the transport position to the harvest position.

2. The transport assembly of claim 1 wherein the roller contacts and moves along the cam plate from the transport positon toward the harvest position during pivotal movement of the support arm.

3. The transport assembly of claim 2 wherein the cam linkage includes a cam arm rotatably coupled to the lift assist frame at a pivot and the roller is rotatably coupled to the cam arm between the pivot and the cam plate.

4. The transport assembly of claim 3 wherein the cam linkage includes one or more lift assist devices each having a first end connected to the lift assist frame and a second end coupled to the cam arm, wherein extension of the second end from the first end of the lift assist device rotates the cam arm about the pivot and moves the roller with respect to the cam plate.

5. The transport assembly of claim 4 further comprising a rotary connector rotatably coupling the support arm to the axle to enable the axle to be aligned perpendicularly to a longitudinal axis of the harvest header in the transport position of the transport assembly and to be aligned generally parallel to the longitudinal axis of the harvest header in the harvest position of the transport assembly.

6. The transport assembly of claim 5 further comprising a latch mechanism operatively connected to the axle, wherein the latch mechanism latches the transport assembly to the header frame in the harvest position.

7. The transport assembly of claim 6 wherein the latch mechanism includes a latch handle operatively connected to a pin, wherein the latch handle moves the pin from one of a latched position or an unlatched position to another of the latched position or the unlatched position, wherein the latched position latches the transport assembly to the header frame in the harvest position.

8. The transport assembly of claim 7 further comprising a suspension frame operatively connected to the header frame, wherein the pin engages a part of the suspension frame to latch the transport assembly to the header frame in the harvest position.

9. The transport assembly of claim 8 further comprising a hydraulic actuator operatively connected to the suspension frame, wherein the suspension frame is operatively connected to the axle in the harvest position and the hydraulic actuator dampens movement of the transport assembly with respect to the header frame in the harvest position.

10. A header for harvesting crop comprising:
    a cutter bar configured to cut crop for harvesting;
    a header frame supporting the cutter bar; and
    a transport assembly including a mounting frame operatively connected to the header frame, a support arm rotatably coupled to an axle of the transport assembly and pivotably coupled to the mounting frame, the support arm including a transport position and a harvest position, and a cam linkage disposed at the mounting frame and the support arm, the cam linkage including a roller connected to the mounting frame and a cam plate having an apex engaged by the roller, the cam plate connected to the support arm, wherein the roller contacts the cam plate in the transport position and the roller is separated from the cam plate in the harvest position and further wherein the cam linkage provides a mechanical advantage for an operator to move the transport assembly from the transport position to the harvest position.

11. The header of claim 10 wherein the roller contacts and moves along the cam plate from the transport position toward the harvest position during pivotal movement of the support arm.

12. The header claim 11 wherein the cam linkage includes a cam arm rotatably coupled to the mounting frame at a pivot and the roller is rotatably coupled to the cam arm between the pivot and the cam plate.

13. The header of claim 12 wherein the cam linkage includes a lift assist device having a first end connected to mounting frame and a second end coupled to the cam arm, wherein extension of the second end from the first end of the lift assist device rotates the cam arm about the pivot and moves the roller with respect to the cam plate.

14. The header of claim 13 further comprising a rotary connector rotatably coupling the support arm to the axle to enable the axle to be aligned perpendicularly to a longitudinal axis of the header in the transport position of the transport assembly and to be aligned generally parallel to the longitudinal axis of the header in the harvest position of the transport assembly.

15. The header of claim 14 further comprising a latch mechanism operatively connected to the axle, wherein the latch mechanism latches the transport assembly to the header frame in the harvest position.

16. The header of claim 15 wherein the latch mechanism includes a latch handle operatively connected to a pin, wherein the latch handle moves the pin from one of a latched position or an unlatched position to another of the latched position or the unlatched position, wherein the latched position latches the transport assembly to the header frame in the harvest position.

17. The header of claim 16 further comprising a suspension frame operatively connected to the header frame, wherein the pin engages a part of the suspension frame to latch the transport assembly to the header frame in the harvest position.

18. A method of moving a transport assembly of a harvesting header from a transport position to a harvest position, the transport assembly having an axle supporting wheels and a support arm operatively connected between the axle and a frame of the harvesting header, the method comprising:
    enabling rotational movement of the axle about the support arm;
    assisting pivotal movement of the support arm with a lift assist device in response to an upward force applied to the axle;
    applying a force with a cam roller to engage a cam surface of the support arm in response to the assisted pivotal movement to move the transport assembly to the harvest position, wherein the cam surface includes an apex;
    disengaging the cam roller from the cam surface as the transport assembly moves to the harvest position; and
    engaging a latch mechanism fixedly connected to the axle of the transport assembly with a catch of a frame of the harvesting header in response to the applied cam roller to the cam surface and the upward force applied to the axle, wherein the latch mechanism is centrally located on the axle.

19. The method of claim 18 wherein the assisting pivotal movement of the support arm includes extending an arm of a gas strut of the lift assist device in response to the upward force applied to the axle.

20. The method of claim 19 wherein the engaging the latch of the transport assembly with the frame of the harvesting header includes engaging a spring loaded pin with the catch of the frame of the harvesting header to latch the transport assembly to the frame of the harvesting header.

\* \* \* \* \*